F. Hayek.
Lounge.

No. 87,411. Patented Mar. 2, 1869.

FRANCIS HAYEK, OF NEW YORK, N. Y.

Letters Patent No. 87,411, dated March 2, 1869.

IMPROVED LOUNGE.

The Schedule referred to in these Letters Patent and making part of the same.

*To all whom it may concern:*

Figure 1:
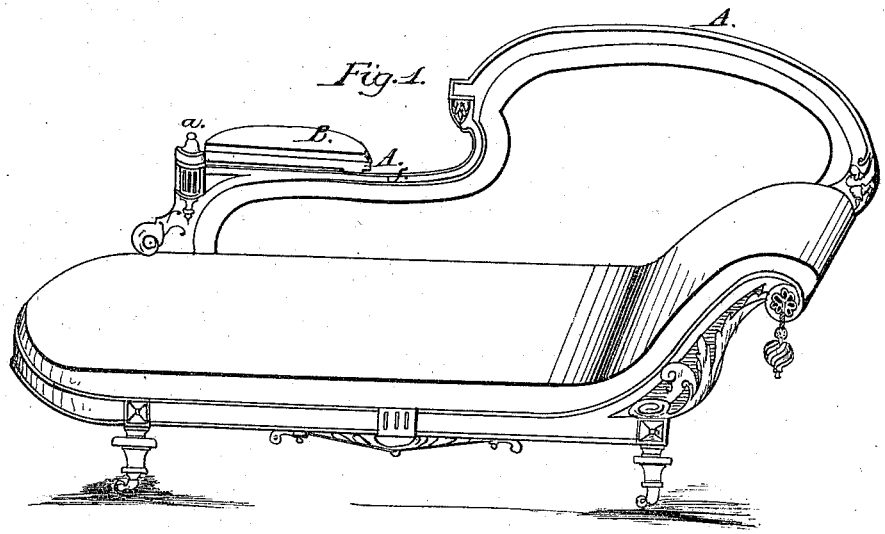
Figure 2:
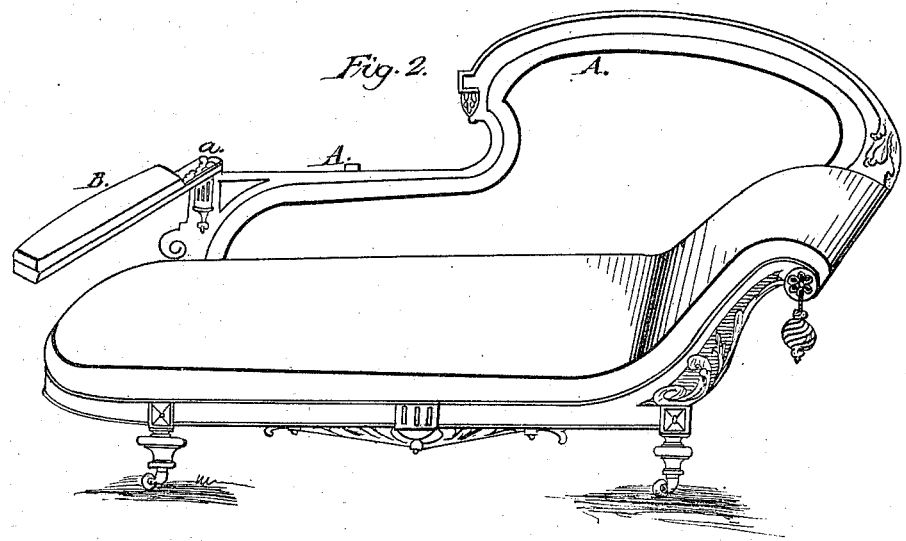

Be it known that I, FRANCIS HAYEK, of New York, in the county of New York, and State of New York, have invented a new and useful Improvement in Lounges; and I do hereby declare that the following is a full, clear, and exact description thereof, which will enable others skilled in the art to make and use the same, reference being had to the accompanying drawings, forming part of this specification, in which Figures 1 and 2 are perspective views of lounges provided with my improved attachment.

Similar letters of reference indicate corresponding parts.

The object of this invention is to provide a lounge with an arm or foot-support at its open end, so that it may, if desired, be used like a sofa, by two persons, who can both support their arms.

Such an attachment is also important, as it allows a convenient position on the foot-end of the lounge, when, on dark days, it is desired to read on the lounge, whose foot-end generally is nearer to a window than the head-end.

For reclining postures, this attachment is also convenient, as it forms a support for the feet.

A, in the drawing, represents the frame of a lounge, of ordinary or suitable form, and of suitable construction.

Near the foot-end is attached to this frame a pivoted bar, B, which can be swung out of the way, as in fig. 1, when not used, and which, when needed, can be swung out to reach across the foot-end of the lounge, as shown in fig. 2.

It forms a convenient arm or foot-support, and may be upholstered or plain, as may be desired.

The pivot $a$, on which it swings, may be in a horizontal, vertical, or other suitable position, and the arm may, when swung out, be braced in suitable manner, or not, as may be found most practicable for every particular lounge.

I do not confine myself to any particular form or mode of attachment of the said arm B, nor of the lounge to which it is attached.

The pivoted end of the arm is provided with a stop to prevent said arm from being swung outward from the end of the lounge when in use, and to hold it in a transverse position.

Having thus described my invention,

I claim as new, and desire to secure by Letters Patent—

The movable arm B, provided with a stop, and arranged near the foot-end of a lounge, so as to form an arm or foot-support, which can be moved out of the way, when not needed, substantially as herein shown and described.

F. HAYEK.

Witnesses:
 FRANK BLOCKLEY,
 ALEX. F. ROBERTS.